(No Model.)
A. SCHEID.
HYDRANT.
No. 495,711. Patented Apr. 18, 1893.
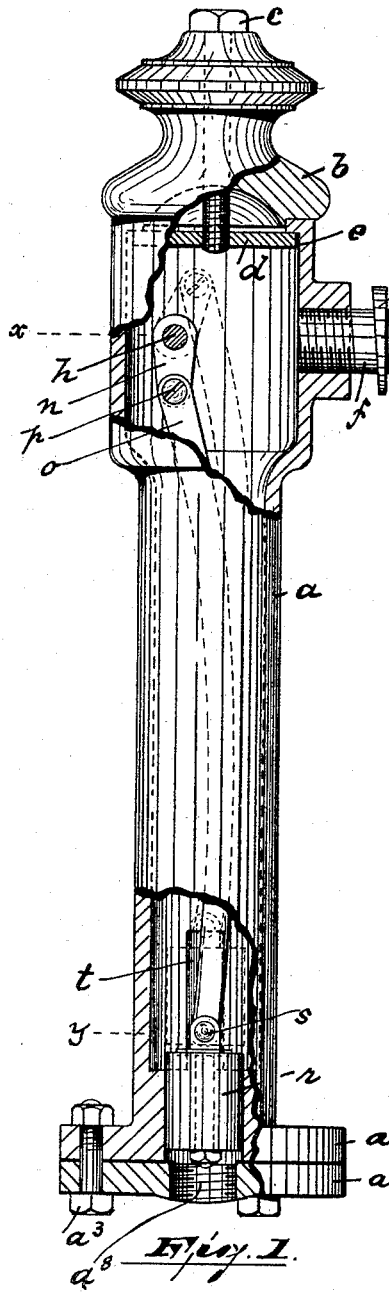
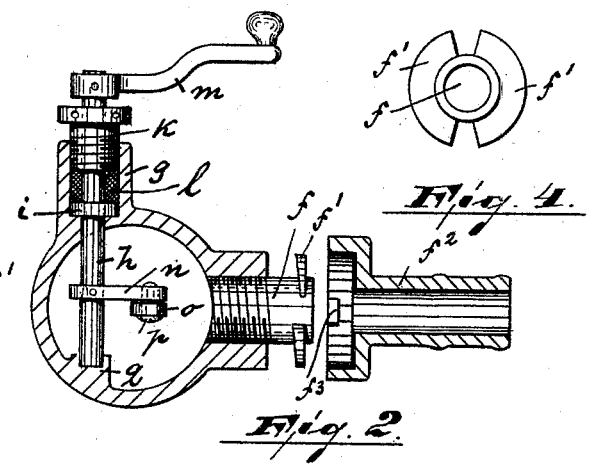
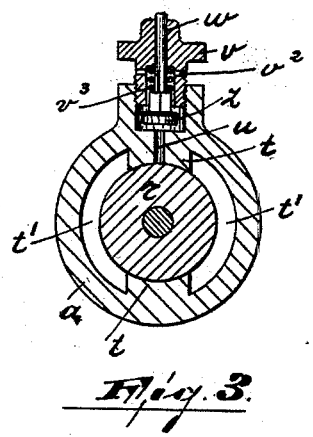
WITNESSES:
Wm. D. Bell.
D. Robertson.
INVENTOR:
Adam Scheid
BY Gartner & Co
ATTORNEYS.

UNITED STATES PATENT OFFICE.

ADAM SCHEID, OF HARRISON, NEW JERSEY.

HYDRANT.

SPECIFICATION forming part of Letters Patent No. 495,711, dated April 18, 1893.

Application filed July 26, 1892. Serial No. 441,292. (No model.)

*To all whom it may concern:*

Be it known that I, ADAM SCHEID, a subject of the Emperor of Germany, residing at Harrison, Hudson county, and State of New Jersey, have invented certain new and useful Improvements in Hydrants; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a hydrant, simple and durable in construction, quick in operation and not liable to get out of order.

The invention consists in the improved hydrant, its piston operating mechanism, its coupling, and the arrangement and combination of the various parts thereof, substantially as will be hereinafter more fully described and finally embodied in the clauses of the claim.

Referring to the accompanying drawings, in which like letters of reference indicate corresponding parts in each of the several views: Figure 1. is an elevation of my improved hydrant, part of it being shown in section; Fig. 2. illustrates a sectional view on line $x$ Fig. 1. and in addition, the female part of the coupling (detached). Fig. 3. is an enlarged sectional view on line $y$. Fig. 1. Fig. 4. is a detail view of the male part of the coupling.

In said drawings $a$ represents the hydrant body, provided with a top or cap $b$. Through the center of said top passes a bolt $c$, adapted to engage the threaded opening of cross bar $d$, which again rests against the inner shoulder $e$ of the body, as clearly shown in Fig. 1. of the drawings. Below said shoulder, and cast integral with the body, is arranged an internally threaded tube, adapted to receive the threaded end of the male part $f$ of the coupling. Said part is provided at its free end with two segmental flanges $f'$, adapted to be engaged by corresponding lugs $f^3$ of the female part $f^2$ of the coupling. The lower portion of the hydrant body $a$ is provided with a circular flange $a'$, to which is secured— by bolts $a^3$ or in any desired manner—a metal plate $a^2$ with inlet connection $a^8$. Within the body $a$ is arranged the piston $r$, pivotally secured—at $s$—to the piston rod $o$. The upper end of said piston rod is again pivotally connected—by pin $p$—with one end of lever $n$. The other end of said lever is firmly secured to shaft $h$, which has its bearings in bushing $k$ and projecting lug $q$ of the body. The bushing $k$ is screwed into the internally threaded projection $g$ of the body, and presses against the packing $l$, which again rests against a collar or shoulder $i$ on shaft $h$, thus providing a water tight bearing for said shaft. The outer end of the shaft is provided with a squared portion, adapted to be engaged by the squared hole of operating crank $m$.

Above the piston $r$ and cast integral with body $a$ are arranged guiding blocks $t$, adapted to guide the said piston in its upward movement, and also to form with said piston (when the latter is moved upward) channels $t'$ through which the inflowing water enters the hydrant. One of said guiding blocks is provided with the air or water outlet $u$, arranged opposite a valve $z$ which again is secured to stem $w$. Said stem operates in bushing $v$ and is controlled by spiral spring $v^3$. The bushing $v$ is provided with openings $v^2$, as shown in Fig. 3. of the drawings.

In operating my improved hydrant, the crank $m$ is turned to the right (or left, as the case may be) for about one hundred and eighty degrees. The inlet $a^8$ is thus opened, and the water free to enter the hydrant through channel $t'$. The air hole or outlet $u$ is now closed by the piston. When the crank $m$ is returned to its normal position, the inlet $a^8$ is closed and the outlet $u$ opened. If the pressure of the water, remaining in the hydrant, is not exceedingly large, the water will run off through said outlet, without operating the valve $z$. Should the said pressure be sufficient to close said valve, the water will remain in the hydrant; but the least pressure on the projecting end of the valve carrying stem $w$, will open said valve, thus allowing the water to escape through openings $u$ and $v$, as will be manifest.

Having thus described my invention, what I claim as new, and desire to secure by Letters Patent, is—

In a hydrant, the combination with a shell $a$, having an inlet pipe $a^8$ at its lower end and in the center line of said shell, with the piston $r$ adapted to slide within said shell and within the inlet pipe $a^8$ and when depressed to close down within said pipe $a^8$, and with the rod $o$ placed within said shell $a$ and pivotally connected at its lower end to the piston $r$, and with the crank $m$ and arm $n$, adapted to raise and lower said piston rod $o$ and piston $r$ and to slide within and alternately open and close said inlet pipe $a^8$, said piston $r$, its rod $o$, the arm $n$ and the crank $m$ being so arranged and constructed, that it requires the crank to be turned one hundred and eighty degrees to fully open or close said inlet pipe $a^8$, substantially as and for the purposes set forth.

In testimony that I claim the foregoing I have hereunto set my hand this 20th day of July, 1892.

ADAM SCHEID.

Witnesses:
ALFRED GARTNER,
WM. D. BELL.